(12) United States Patent
Hsu et al.

(10) Patent No.: US 12,366,886 B2
(45) Date of Patent: Jul. 22, 2025

(54) TRANSMISSION DOCK AND ELECTRONIC DEVICE

(71) Applicant: Getac Technology Corporation, New Taipei (TW)

(72) Inventors: Wan-Lin Hsu, Taipei (TW); Juei-Chi Chang, Taipei (TW); Hsin-Chih Chou, Taipei (TW)

(73) Assignee: Getac Technology Corporation, New Taipei (TW)

(*) Notice: Subject to any disclaimer, the term of this patent is extended or adjusted under 35 U.S.C. 154(b) by 180 days.

(21) Appl. No.: 17/980,635

(22) Filed: Nov. 4, 2022

(65) Prior Publication Data

US 2023/0259166 A1 Aug. 17, 2023

Related U.S. Application Data

(60) Provisional application No. 63/309,102, filed on Feb. 11, 2022.

(30) Foreign Application Priority Data

Aug. 18, 2022 (CN) .......................... 202210991555.1

(51) Int. Cl.
G06F 1/16 (2006.01)
(52) U.S. Cl.
CPC .................................. *G06F 1/1632* (2013.01)
(58) Field of Classification Search
CPC ..... G06F 1/1632; G06F 1/1681; G06F 1/1669
See application file for complete search history.

(56) References Cited

U.S. PATENT DOCUMENTS

| 10,349,544 B2 | 7/2019 | Katsuyama et al. |
| 2017/0322599 A1 | 11/2017 | Jung et al. |
| 2018/0109030 A1 | 4/2018 | Nakatani et al. |
| 2018/0181166 A1* | 6/2018 | Katsuyama ............ H05K 5/023 |
| 2020/0236799 A1 | 7/2020 | Roth |

FOREIGN PATENT DOCUMENTS

| CN | 106681429 A | 5/2017 |
| TW | M381095 U | 5/2010 |

OTHER PUBLICATIONS

Taiwan Patent Office, "Office Action", Mar. 23, 2023, Taiwan.
European Patent Office, Search Report, Jun. 20, 2023, Germany.

* cited by examiner

*Primary Examiner* — Anthony Q Edwards
(74) *Attorney, Agent, or Firm* — Troutman Pepper Locke LLP; Tim Tingkang Xia, Esq.

(57) ABSTRACT

An electronic device includes an input unit and a transmission dock. The transmission dock is pivotally connected to the input unit, and includes at least one pivotal concave portion, a first wall, a second wall and a third wall. The at least one pivotal concave portion has a first sidewall and a second sidewall opposite to each other. The first wall is connected to the first sidewall and the second sidewall. The second wall is connected to the first sidewall and the second sidewall. The third wall is connected to the first sidewall and the second sidewall. The first wall and the second wall are connected to two opposite sides of the third wall, respectively. An inner surface of the third wall forms a sloped surface toward each of the first sidewall and the second sidewall, and each of the sloped surfaces has an opening at an end thereof.

7 Claims, 5 Drawing Sheets

TRANSMISSION DOCK AND ELECTRONIC DEVICE

CROSS-REFERENCE TO RELATED APPLICATIONS

The application claims the benefit of a U.S. Provisional Patent Application No. 63/309,102, filed on Feb. 11, 2022, the disclosure of which is hereby incorporated by reference herein in its entirety. The application further claims priority to a Chinese Patent Application No. 202210991555.1, filed on Aug. 18, 2022, the disclosure of which is also hereby incorporated by reference herein in its entirety.

BACKGROUND OF THE INVENTION

Field of the Invention

The present application relates to an electronic device and, more particularly, to a portable electronic device and a transmission dock of the electronic device.

Description of the Prior Art

Regarding a conventional portable electronic device, when frequently transported or used outdoors, water may enter the interior of the electronic device in rainy days or in other circumstances. The life cycle of the electronic device may be undesirably affected in case of water accumulation if the water is not timely discharged.

Thus, to facilitate discharge of water for such type of portable electronic device, additional holes are usually provided at the bottom of a casing so as to achieve the effect of water drainage. However, the additional holes provided on the casing may cause foreign substances such as water or dust to more likely enter the interior of the electronic device, and an excessive number of holes provided on the casing may also affect aesthetic values of the appearance of the electronic device.

SUMMARY OF THE INVENTION

In view of the above issues, an electronic device provided according to an embodiment includes an input unit and a transmission dock. The transmission dock is pivotally connected to the input unit, and includes at least one pivotal concave portion, a first wall, a second wall and a third wall. The at least one pivotal concave portion has a first sidewall and a second sidewall opposite to each other. The first wall is connected to the first sidewall and the second sidewall. The second wall is connected to the first sidewall and the second sidewall. The third wall is connected to the first sidewall and the second sidewall. The first wall and the second wall are connected to two opposite sides of the third wall, respectively. An inner surface of the third wall forms a sloped surface toward each of the first sidewall and the second sidewall, and each of the sloped surfaces has an opening at an end thereof.

In some embodiments, the at least one pivotal concave portion is two in quantity, the inner surface of the third wall between the two pivotal concave portions has a junction, and the junction forms a sloped surface toward each of the first sidewall and the second sidewall.

In some embodiments, the two pivotal concave portions are located on the relative outermost sides of the transmission dock, respectively.

In some embodiments, the junction is located at the center of the inner surface of the third wall.

In some embodiments, the height of the sloped surfaces gradually reduces from the junction toward the first sidewall and the second sidewall.

In some embodiments, the height of the sloped surfaces gradually reduces toward the first sidewall and the second sidewall.

In some embodiments, each of the openings is provided at the first sidewall and the second sidewall, and is connected to each sloped surface.

In some embodiments, a display unit is further included. The transmission dock further includes an accommodating slot, which is for accommodating the display unit.

In some embodiments, a pivotal member is further included. The pivotal member is provided at the at least one pivotal concave portion such that the input unit and the transmission dock are capable of rotating relative to each other.

A transmission dock provided according to another embodiment includes at least one pivotal concave portion, a first wall, a second wall and a third wall. The at least one pivotal concave portion has a first sidewall and a second sidewall opposite to each other. The first wall is connected to the first sidewall and the second sidewall. The second wall is connected to the first sidewall and the second sidewall. The third wall is connected to the first sidewall and the second sidewall. The first wall and the second wall are connected to two opposite sides of the third wall, respectively. An inner surface of the third wall forms a sloped surface toward each of the first sidewall and the second sidewall, and each of the sloped surfaces has an opening at an end thereof.

In conclusion, in the electronic device and the transmission dock provided according to the above embodiments, with the inner surfaces formed as sloped surfaces, water inside the electronic device and the transmission dock is guided to the pivotal concave portion, and the water is discharged through openings originally present at the pivotal concave portion, hence avoiding the issue that foreign substances are likely to enter through holes additionally provided on a surface of a casing, and eliminating holes from the casing to maintain an intact appearance of the casing.

DETAILED DESCRIPTION OF THE EMBODIMENTS

Figure 1:
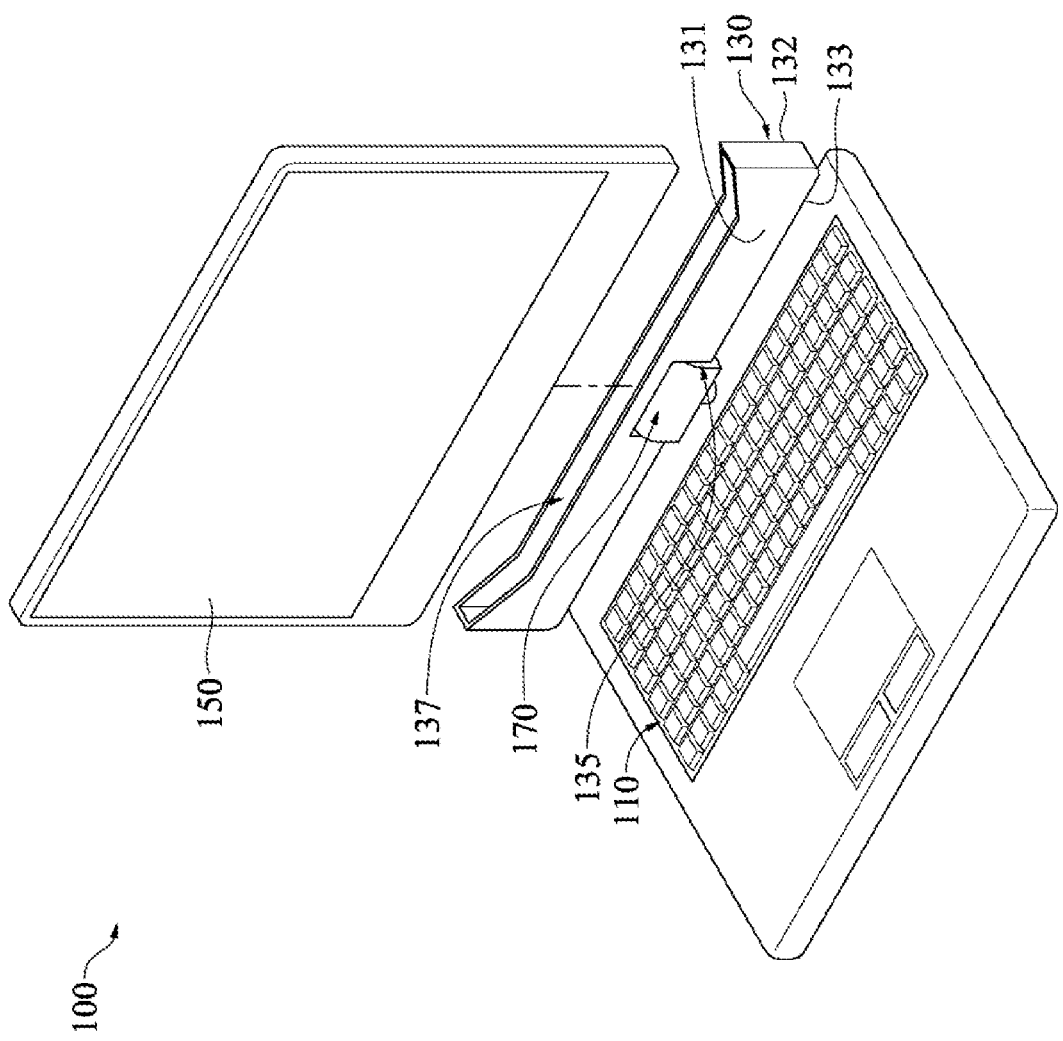
FIG. 1 is a partial exploded view of an electronic device according to a first embodiment.
Figure 2:
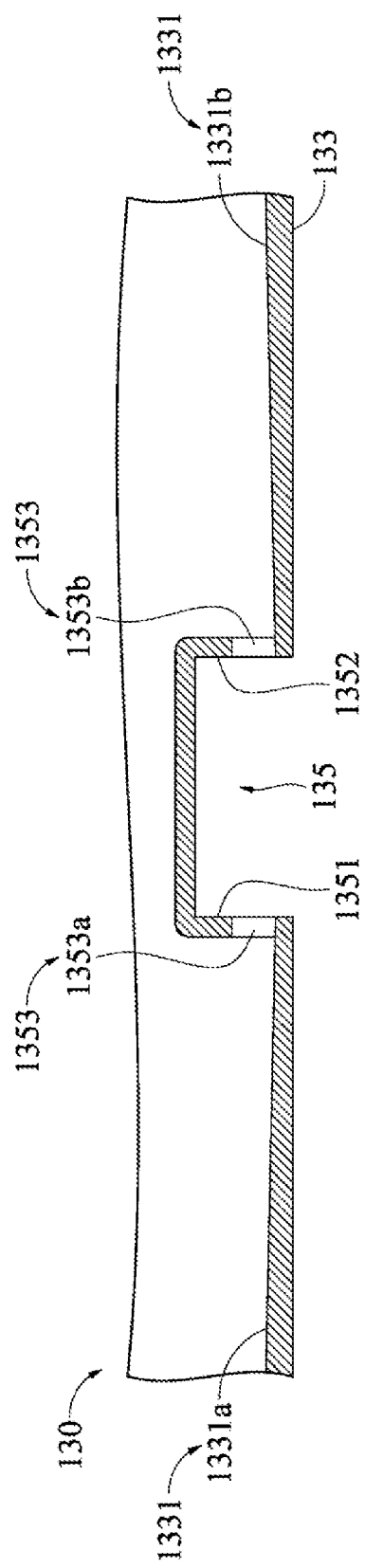
FIG. 2 is a partial cross-sectional view of the transmission dock in FIG. 1.

Refer to FIG. 1 and FIG. 2. FIG. 1 shows a partial exploded view of an electronic device according to a first embodiment. FIG. 2 shows a partial cross-sectional view of the transmission dock in FIG. 1. In the first embodiment, a transmission dock 130 includes at least one pivotal concave portion 135, a first wall 131, a second wall 132 and a third wall 133. Details of the structure of the transmission dock 130 are described later. The transmission dock 130 is applicable to an electronic device 100. In the first embodiment, the electronic device 100 is, for example but not limited to, a portable computer, and the transmission dock 130 is further applicable to other types of electronic devices. In this embodiment, the electronic device 100 includes an input unit 110 and the above transmission dock 130. Moreover, the portable computer shown in this embodiment further includes a pluggable and an independently operable display unit 150, so as to facilitate utilization and operations in different scenarios. When it is needed to connect the display unit 150 to the input unit 110 (for example, a keyboard) for an expansion operation, the display unit 150 can be inserted into an accommodating slot 137 of the transmission dock 130 so as to complete the assembly.

The transmission dock 130 is pivotally connected to the input unit 110. In the first embodiment, the input unit 110 is, for example, a keyboard device or a touch pad, and the transmission dock 130 is capable of pivoting relative to the input unit 110.

Details of the structure of the transmission dock 130 are described below. In the first embodiment, the transmission dock 130 is pivotally connected to the input unit 110 through the at least one pivotal concave portion 135. The at least one pivotal concave portion 135 has a first sidewall 1351 and a second sidewall 1352 opposite to each other. In the first embodiment, the first sidewall 1351 and the second sidewall 1352 are left and right sidewalls of the pivotal concave portion 135 in FIG. 2, respectively. Referring to FIG. 1 and FIG. 2, the first wall 131 is connected to the first sidewall 1351 and the second sidewall 1352. The second wall 132 is connected to the first sidewall 1351 and the second sidewall 1352. The third wall 133 is connected to the first sidewall 1351 and the second sidewall 1352. The first wall 131 and the second wall 132 are connected to two opposite sides of the third wall 133, respectively. An inner surface 1331 of the third wall 133 forms a plurality of sloped surfaces corresponding to the at least one pivotal concave portion 135. Specifically, each pivotal concave portion 135 corresponds to two sloped surfaces. In particular, for the two sloped surfaces corresponding to each pivotal concave portion 135, the sloped surface toward the first sidewall 1351 is defined as a first sloped surface, and the sloped surface toward the second sidewall 1352 is defined as a second sloped surface. Each of the first sidewall 1351 and the second sidewall 1352 has an opening 1353 at an end of the corresponding sloped surface. Specifically, the first sidewall 1351 has an opening 1353 at an end of the first sloped surface, and the second sidewall has an opening at an end of the second sloped surface.

In the first embodiment, the first wall 131 and the second wall 132 are walls on two opposite sides, and the first wall 131, the second wall 132 and the third wall 133 are connected and enclosed to form the accommodating slot 137. As shown in FIG. 2, the inner surface 1331 of the third wall 133 forms two sloped surfaces; that is, an inner surface 1331a of the third wall 133 connected to the first sidewall 1351 forms a descending sloped surface (i.e., the first sloped surface) from the left side of the transmission dock 130 toward the first sidewall 1351, and an inner surface 1331b of the third wall 133 connected to the second sidewall 1352 forms a descending sloped surface (i.e., the second sloped surface) from the right side of the transmission dock 130 toward the second sidewall 1352. As such, when the electronic device 100 is in use, water entering an internal space of the transmission dock 130 through between the transmission dock 130 and the display unit 150 can be guided through the inner surfaces 1331a and 1331b to the pivotal concave portion 135, and be discharged through the openings 1353 at the ends of the sloped surfaces. Herein, the end of the sloped surface refers to a lowermost end of the sloped surface. In the first embodiment, the pivotal concave portion 135 is, for example but not limited to, one in quantity.

Specifically, with the inner surface 1331 formed as sloped surfaces, water in the internal space of the transmission dock 130 of the electronic device 100 is guided to the pivotal concave portion 135, and the water can be discharged from the openings 1353, hence avoiding the issue that foreign substances are likely to enter from holes additionally provided for discharging incoming water on the third wall 133 of the transmission dock 130 of the electronic device 100, and eliminating holes from the third wall 133 to maintain an intact appearance of the transmission dock 130.

In the first embodiment, the openings 1353 are provided on the first sidewall 1351 and the second sidewall 1352, and are connected to the respective sloped surfaces. As shown in FIG. 2, an opening 1353a located on the first sidewall 1351 communicates the inner surface 1331a (i.e., the first sloped surface) with the pivotal concave portion 135, and an opening 1353b located on the second sidewall 1352 communicates the inner surface 1331b (i.e., the second sloped surface) with the pivotal concave portion 135, such that water in the internal space of the transmission dock 130 is guided by the sloped surfaces and discharged through the openings 1353a and 1353b.

In the first embodiment, the electronic device 100 further includes a pivotal member 170. The pivotal member 170 is provided at the pivotal concave portion 135 such that the input unit 110 and the transmission dock 130 are capable of rotating relative to each other. As shown in FIG. 1, with the pivotal member 170, the input unit 110 is pivotally connected to the pivotal concave portion 135, such that the input unit 110 and the transmission dock 130 are capable of pivoting relative to each other.

Figure 3:
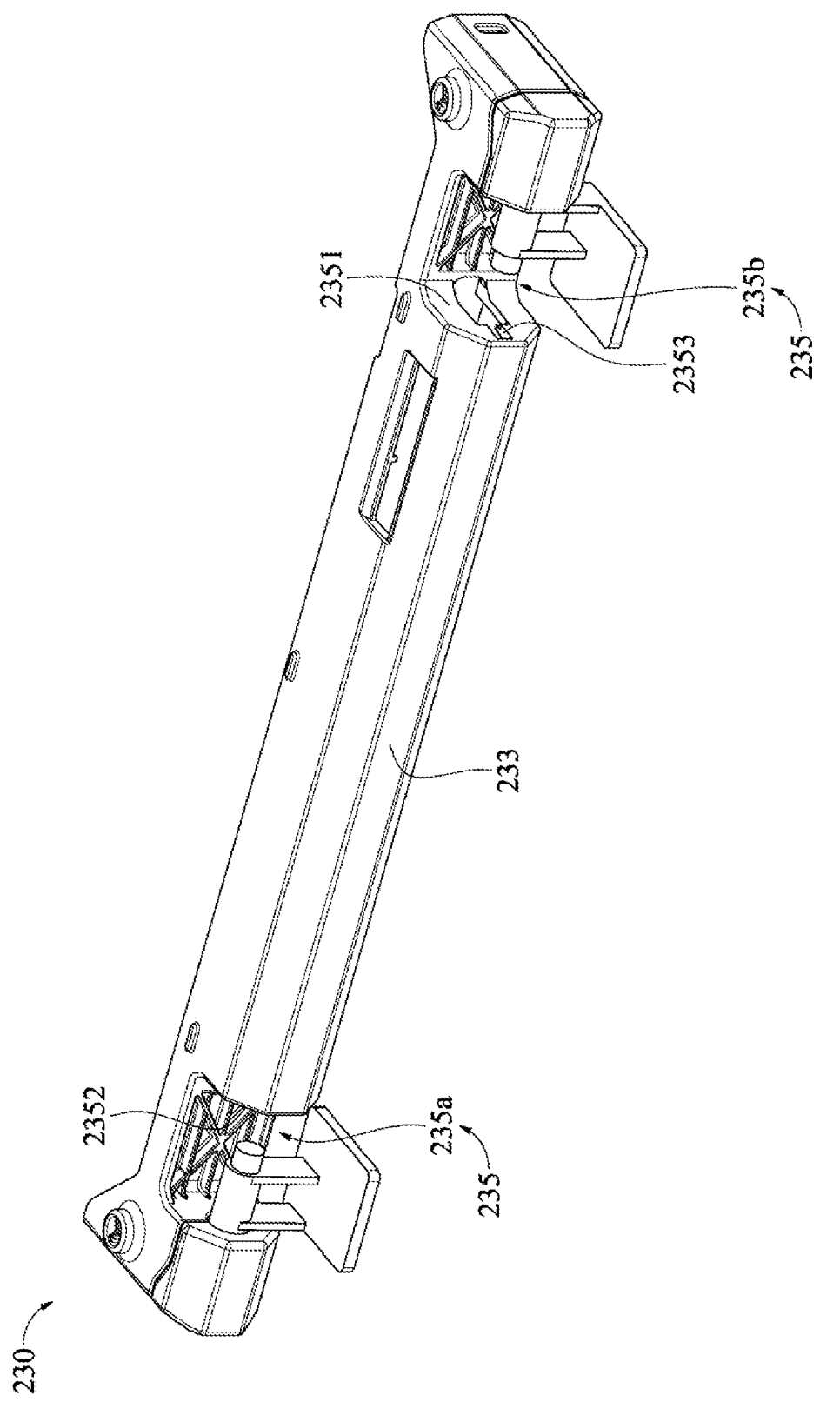
FIG. 3 is a schematic diagram of a transmission dock according to a second embodiment.
Figure 4:
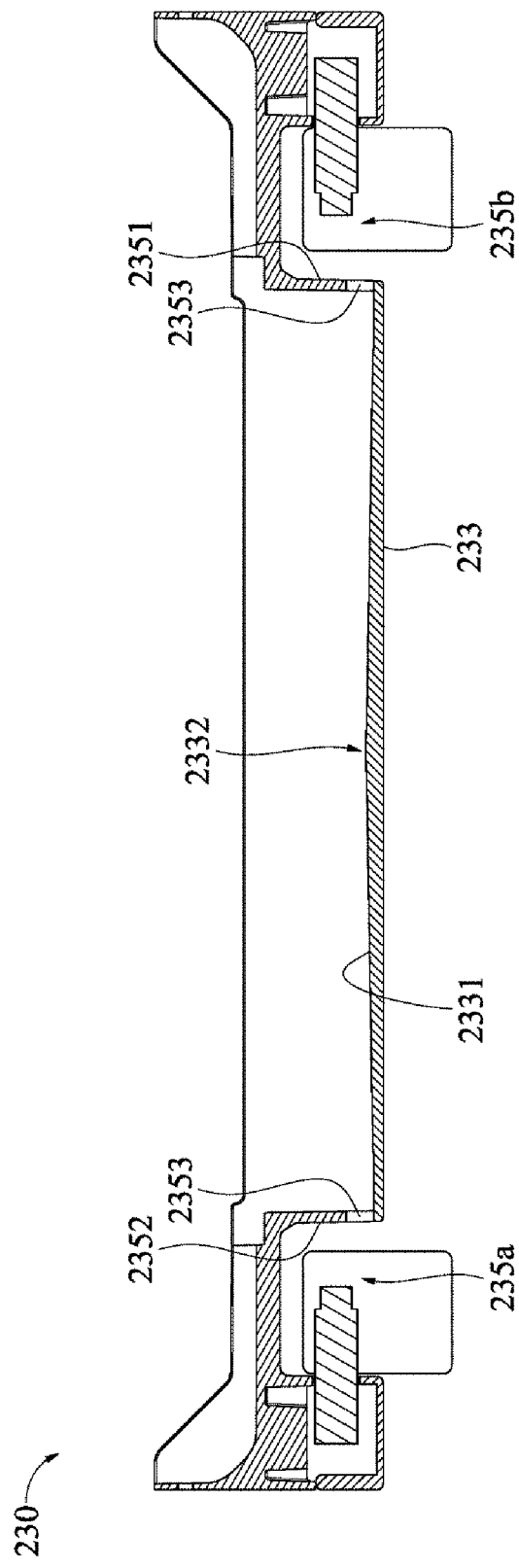
FIG. 4 is a cross-sectional schematic diagram of the transmission dock in FIG. 3.

Next, refer to FIG. 3 to FIG. 4. FIG. 3 shows a schematic diagram of a transmission dock according to a second embodiment. FIG. 4 shows a cross-sectional schematic diagram of the transmission dock in FIG. 3. Details of structures of the second embodiment similar to those of the first embodiment are omitted herein. In the second embodiment, a pivotal concave portion 235 of the electronic device is two in quantity, and an inner surface 2331 of a third wall 233 between two pivotal concave portions 235a and 235b has a junction 2332. Sloped surfaces are formed from the junction 2332 toward a first sidewall 2351 and a second sidewall 2352, respectively. Specifically, as shown in FIG. 4, the inner surface 2331 has the junction 2332 serving as a vertex of the sloped surfaces, and the height of the inner surface 2331 gradually reduces from the junction 2332 toward the second sidewall 2352 and the first sidewall 2351 on the left and right sides. As shown in FIG. 4, the inner surface 2331 forms a descending sloped surface from the junction 2332 toward the second sidewall 2352 of the pivotal concave portion 235a, and the inner surface 2331 forms a descending sloped surface from the junction 2332 toward the first sidewall 2351 of the pivotal concave portion 235b. Thus, water entering the accommodating slot 137 can be guided to the two pivotal concave portions 235a and 235b and be discharged through two openings 2353 at the ends of the sloped surfaces, respectively.

In the second embodiment, the two pivotal concave portions 235a and 235b are located, for example but not limited to, on the relative outermost sides of a transmission dock 230. For example, the position of the pivotal concave portion may also be located between the center and the relative outermost side of the transmission dock, with details of the specific structure of this embodiment to be described later. In the second embodiment, the junction 2332 is located, for example but not limited to, at the center of the inner surface 2331 of the third wall 233, so as to evenly guide water entering the internal space to the two pivotal concave portions 235a and 235b on the left and right sides. For example, the junction 2332 may also be located between the center and the relative outermost side of the inner surface 2331, given that routes from the junction 2332 to the openings 2353 of the two pivotal concave portions 235a and 235b on the left and right sides form descending sloped surfaces.

Figure 5:
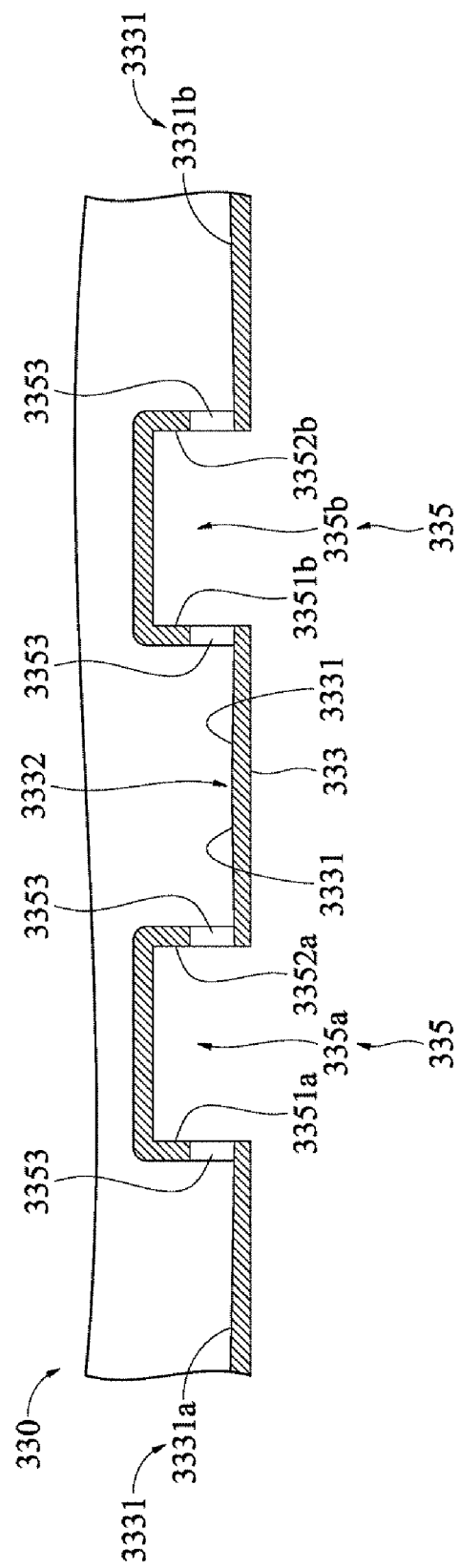
FIG. 5 is a partial cross-sectional view of a transmission dock according to a third embodiment.

Refer to FIG. 5. FIG. 5 shows a partial cross-sectional view of a transmission dock according to a third embodiment. In the third embodiment, a pivotal concave portion 335 is exemplified by two pivotal concave portions 335a and 335b. As shown in FIG. 5, the pivotal concave portion 335a is located between the center and the relative leftmost side of a transmission dock 330 and closer to the center, and the pivotal concave portion 335b is located between the center and the relative rightmost side of the transmission dock 330 and closer to the center. It is known from the first embodiment, the second embodiment and the third embodiment, the pivotal concave portion may be provided at any position on the transmission dock, and different quantities of pivotal concave portions may be provided according to requirements. In this embodiment, an inner surface 3331 of a third wall 333 between the two pivotal concave portions 335a and 335b has a junction 3332, and the junction 3332 forms sloped surfaces toward a second sidewall 3352a of the pivotal concave portion 335a and a first sidewall 3351b of the pivotal concave portion 335b, respectively. As shown in FIG. 5, the inner surface 3331 forms a descending sloped surface (i.e., the second sloped surface) from the junction 3332 toward the second sidewall 3352a of the pivotal concave portion 335a, and the inner surface 3331 forms a descending sloped surface (i.e., the first sloped surface) from the junction 3332 toward the first sidewall 3351b of the pivotal concave portion 335b. Moreover, an inner surface 3331a connected to a first sidewall 3351a of the pivotal concave portion 335a forms a descending sloped surface (i.e., the first sloped surface) from the left side of the transmission dock 330 toward the first sidewall 3351a. An inner surface 3331b connected to a second sidewall 3352b of the pivotal concave portion 335b forms a descending sloped surface (i.e., the second sloped surface) from the right side of the transmission dock 330 toward the second sidewall 3352b. Thus, water entering the internal space can be guided to the two pivotal concave portions 335a and 235b and be discharged through four openings 3353 at the ends of the sloped surfaces, respectively.

In conclusion, in the electronic device and the transmission dock provided according to the above embodiments, with the inner surfaces formed as sloped surfaces, water entering interiors of the electronic device and the transmission dock is guided to the pivotal concave portions, and the water is discharged through openings at the pivotal concave portions. Because openings of the pivotal concave portions provided for arranging a pivotal assembly are used, the issue that foreign substances are likely to enter through holes additionally provided on a surface of a casing is avoided, and holes are also eliminated from the casing to maintain an intact appearance of the casing.

The present disclosure is disclosed as the embodiments above. However, these embodiments are not to be construed as limitations to the present disclosure. Slight modifications and variations may be made to the embodiments by a person skilled in the art without departing from the spirit and scope of the present disclosure. Therefore, the scope of legal protection of the present application should be defined by the appended claims.

What is claimed is:

1. An electronic device, comprising:
an input unit; and
a transmission dock, pivotally connected to the input unit, the transmission dock comprising:
at least one pivotal concave portion, having a first sidewall and a second sidewall opposite to each other;
a first wall, connected to the first sidewall and the second sidewall;
a second wall, connected to the first sidewall and the second sidewall; and
a third wall, connected to the first sidewall and the second sidewall; wherein the first wall and the second wall are connected to two opposite sides of the third wall, respectively;
wherein an inner surface of the third wall forms a plurality of sloped surfaces corresponding to the at least one pivotal concave portion,
wherein each of the at least one pivotal concave portion corresponds to two of the plurality of sloped surfaces, the two of the plurality of sloped surfaces include a first sloped surface toward the first sidewall and a second sloped surface toward the second sidewall, the first sidewall has an opening at an end of the first sloped surface, and the second sidewall has an opening at an end of the second sloped surface.

2. The electronic device according to claim 1, wherein a height of the sloped surfaces gradually reduces toward the first sidewall and the second sidewall.

3. The electronic device according to claim 1, wherein each of the openings is provided at the first sidewall and the second sidewall, and is connected to each of the sloped surfaces.

4. The electronic device according to claim 1, further comprising a display unit; wherein, the transmission dock further comprises an accommodating slot, which is for accommodating the display unit.

5. The electronic device according to claim 4, wherein the first wall, the second wall and the third wall are connected and enclosed to form the accommodating slot.

6. The electronic device according to claim 1, further comprising: a pivotal member, provided at the at least one pivotal concave portion such that the input unit and the transmission dock are capable of rotating relative to each other.

7. A transmission dock, comprising:
a pivotal concave portion, having a first sidewall and a second sidewall opposite to each other;
a first wall, connected to the first sidewall and the second sidewall;
a second wall, connected to the first sidewall and the second sidewall; and
a third wall, connected to the first sidewall and the second sidewall; wherein the first wall and the second wall are connected to two opposite sides of the third wall, respectively;

wherein an inner surface of the third wall forms a plurality of sloped surfaces corresponding to the at least one pivotal concave portion, wherein each of the at least one pivotal concave portion corresponds to two of the plurality of sloped surfaces, the two of the plurality of sloped surfaces include a first sloped surface toward the first sidewall and a second sloped surface toward the second sidewall, the first sidewall has an opening at an end of the first sloped surface, and the second sidewall has an opening at an end of the second sloped surface.

\* \* \* \* \*